United States Patent [19]

O'Brien

[11] Patent Number: 5,222,398
[45] Date of Patent: Jun. 29, 1993

[54] THIN FILM PRECISION LOAD CELL
[75] Inventor: Michael J. O'Brien, Rochester, N.Y.
[73] Assignee: Eastman Kodak Company, Rochester, N.Y.
[21] Appl. No.: 607,938
[22] Filed: Nov. 1, 1990
[51] Int. Cl.⁵ .............................................. G01L 1/04
[52] U.S. Cl. ........................ 73/862.632; 73/862.637; 177/211
[58] Field of Search ........... 73/862.62, 862.65, 862.66; 338/2; 177/211; 366/602

[56] References Cited
U.S. PATENT DOCUMENTS

| | | | |
|---|---|---|---|
| 3,179,826 | 4/1965 | Trott et al. | 310/363 |
| 3,470,400 | 9/1969 | Weisbord | 73/778 |
| 3,611,797 | 10/1971 | Pugnaire | 73/862.65 |
| 4,657,097 | 4/1987 | Griffen | 73/862.65 X |
| 5,053,195 | 10/1991 | MacKay | 420/555 |

FOREIGN PATENT DOCUMENTS 0256832 10/1988 Japan ................................ 73/862.65

Primary Examiner—Donald O. Woodiel
Assistant Examiner—Elizabeth L. Shopbell
Attorney, Agent, or Firm—Mark Z. Dudley

[57] ABSTRACT

A load cell having a loading flexure defining mounting slots for receiving the ends of a strain sensing beam. The strain sensing beam is an I-shaped member having a tapered width along its length and bearing pairs of strain gauges on the top and bottom sides. The strain sensing beam is mounted in the slots of the loading flexure with an amalgam. The thermal coefficients of expansion of the strain sensing beam, the strain gauges, and the amalgam are all matched to within a factor of 2 to provide an inherently thermally compensated load cell that is easily manufactured and free from hysteresis.

7 Claims, 4 Drawing Sheets

THIN FILM PRECISION LOAD CELL

FIELD OF THE INVENTION

The present invention relates to force transducers of the type known as load cells for measuring force, and more particularly to extremely high precision load cells for measuring very small changes in applied force.

BACKGROUND OF THE INVENTION

Generally, a load cell comprises a flexure member to which the force being measured is applied. The flexure member flexes by an amount proportional to the magnitude of the applied force. Strain gauges of the type that change their electrical resistance in response to distortion are coupled to the flexure member for generating an electrical signal in accordance with the force being measured. In some such load cells, the strain gauges are attached directly to the surface of the flexure members. For example, see U.S. Pat. No. 4,747,456 issued May 31, 1988 to Kitagawa et al.

One of the problems generally encountered with the strain gauges applied to such load cells is that of creep, whereby the output signal slowly changes over time when the gauge is stressed and held in the stressed position. Another problem often encountered is that of hysteresis, whereby the signal does not return to zero when the stress is removed from the load cell, the load cell must be stressed in the opposite direction to force the output to return to zero. Another problem often encountered is that of temperature sensitivity. That is, the output of the gauges on the load cell change with changes in temperature, resulting in the need for complex temperature compensating mechanisms to be built into the strain gauges (see U.S. Pat. No. 4,747,456 above).

SUMMARY OF THE INVENTION

It is therefore the object of the present invention to provide a load cell that overcomes the shortcomings noted above.

The object is achieved according to the present invention by providing a load cell having a loading flexure defining mounting slots for receiving the ends of a strain sensing beam. The strain sensing beam includes an I-shaped beam member having a tapered width along its length with widened ends to facilitate strain free mounting. The I-shaped beam is provided on both sides with pairs of thin film strain gauges, at the center of the beam. The strain sensing beam is being mounted in the slots with a solidifiable amalgam, in such a manner as to be flexed when the loading flexure is flexed. The thermal expansion coefficient of the I-shaped beam, the strain gauges, and the amalgam are matched to within a factor of 2 with each other. The resulting load cells exhibit inherent temperature insensitivity, reduced creep and reduced hysteresis compared to prior art load cells.

According to a preferred embodiment of the invention, the I-shaped beam is stainless steel, coated on both sides by a thin film of glass. The strain gauges are patterned thin films of NiCr, and are protected by another thin film of glass. The amalgam is Ga-Ni, in a proportion chosen to match the thermal coefficient with that of the strain gauges in the stainless steel.

MODES OF CARRYING OUT THE INVENTION

Figure 1:
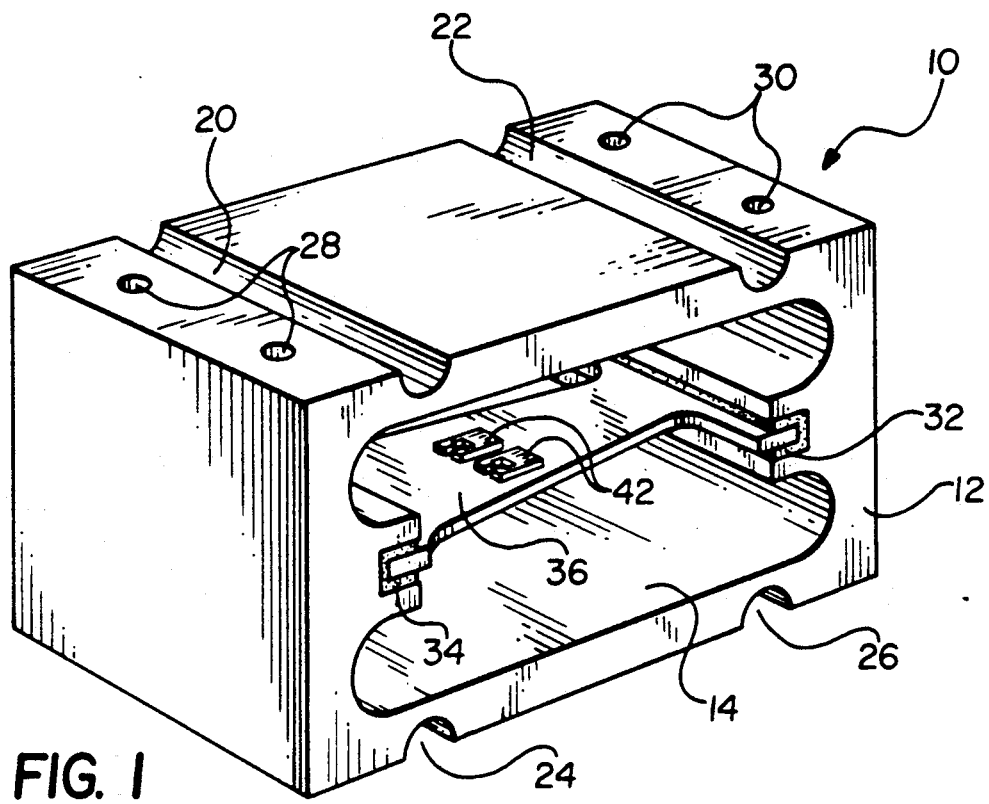
FIG. 1 is a perspective view of a load cell according to the present invention.
Figure 2:
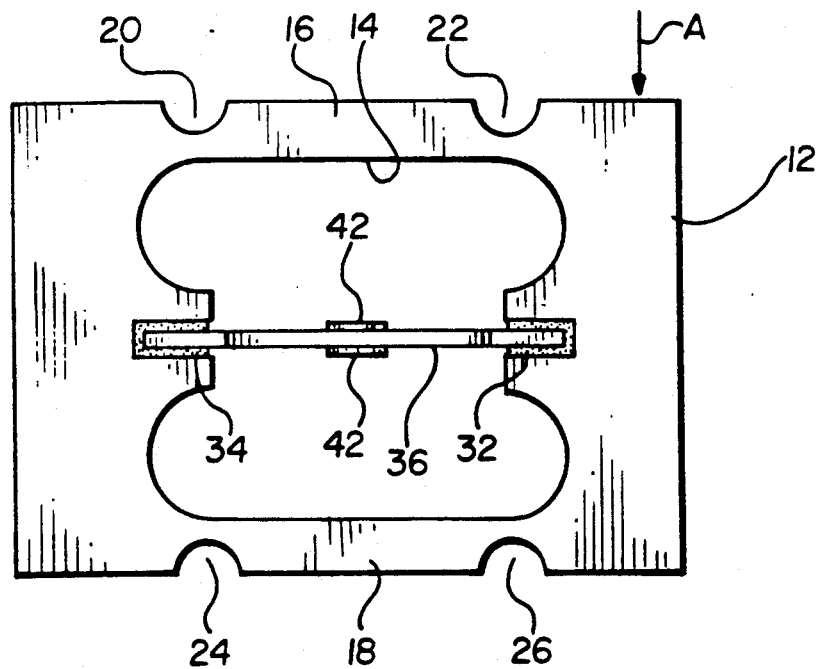
FIG. 2 is a front view of the load cell according to the present invention.

An embodiment of the present invention will now be described with reference to FIGS. 1-5. A load cell 10 according to the present invention includes a loading flexure 12 as shown in FIGS. 1 and 2. The loading flexure 12 is in the form of an elastic rectangular parallelepiped made of a metal material such as AM 335 Stainless Steel and having a flattened 8-shaped transverse hole 14 formed in a vertical wall thereof by machining to define a top plate 16 and a bottom plate 18. Channels 20, 22 and 24, 26 are formed in the top and bottom plates to provide reduced cross sectional portions where flexing occurs when an end of the loading flexure is held, and a force (represented by arrow A) is applied to the other end.

A pair of mounting holes 28 are formed in one end of the load cell for mounting the load cell to a support, and another pair of mounting holes 30 are formed in the other end of the load cell for mounting a force receiving member.

The interior portion of the load cell defines a pair of parallel slots 32 and 34 for receiving a strain sensing beam 36.

Figure 3:
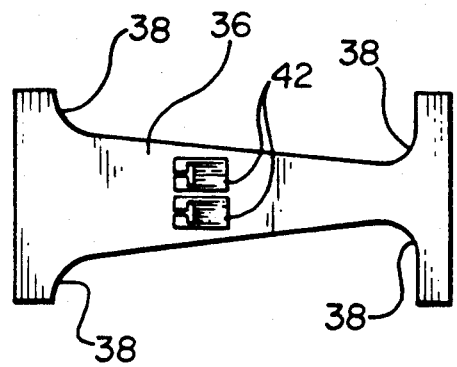
FIG. 3 is a top view of the sensing beam employed in the load cell shown in FIG. 1.
Figure 4:
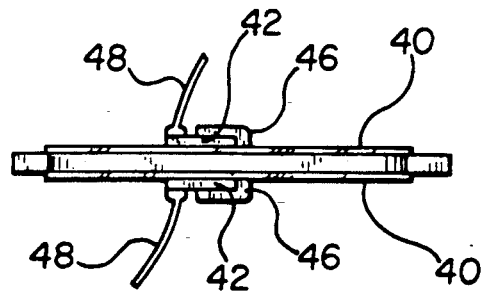
FIG. 4 is a side view of the sensing beam shown in FIG. 2.

A top view of the strain sensing beam 36 is shown in FIG. 3. The strain sensing beam is a flat I-shaped member formed from a sheet of material such as stainless steel, for example by chemical milling. The central portion of the I-shaped beam has a tapered width along its length to produce a constant shear along its length when the beam is flexed. Fillets 38 are provided at the ends of the tapered section to reduce stress concentrations and insure constant stress over the gauge area. Both ends of the strain sensing beam 36 are provided with a large surface area for mounting. The top and bottom sides of the strain sensing beam 36 are covered with an insulating layer, preferrably a layer of $SiO_2$ 1 $\mu m$ thick. The ends are left uncoated for the purpose of bonding the strain sensing beam into the loading flexure 12 as described below.

A plurality of strain gauges may be accurately placed on a sheet of stainless steel using the patterning techniques common to integrated circuit manufacture, thereafter, the beams themselves may be cut from the sheet using the technique of chemical milling employing a photoresist mask. Since the process of forming the beams is related to the process of forming the gauges, a very high degree of precise placement of the gauges on the beams is achieved employing the techniques of integrated circuit manufacture.

Figure 5:
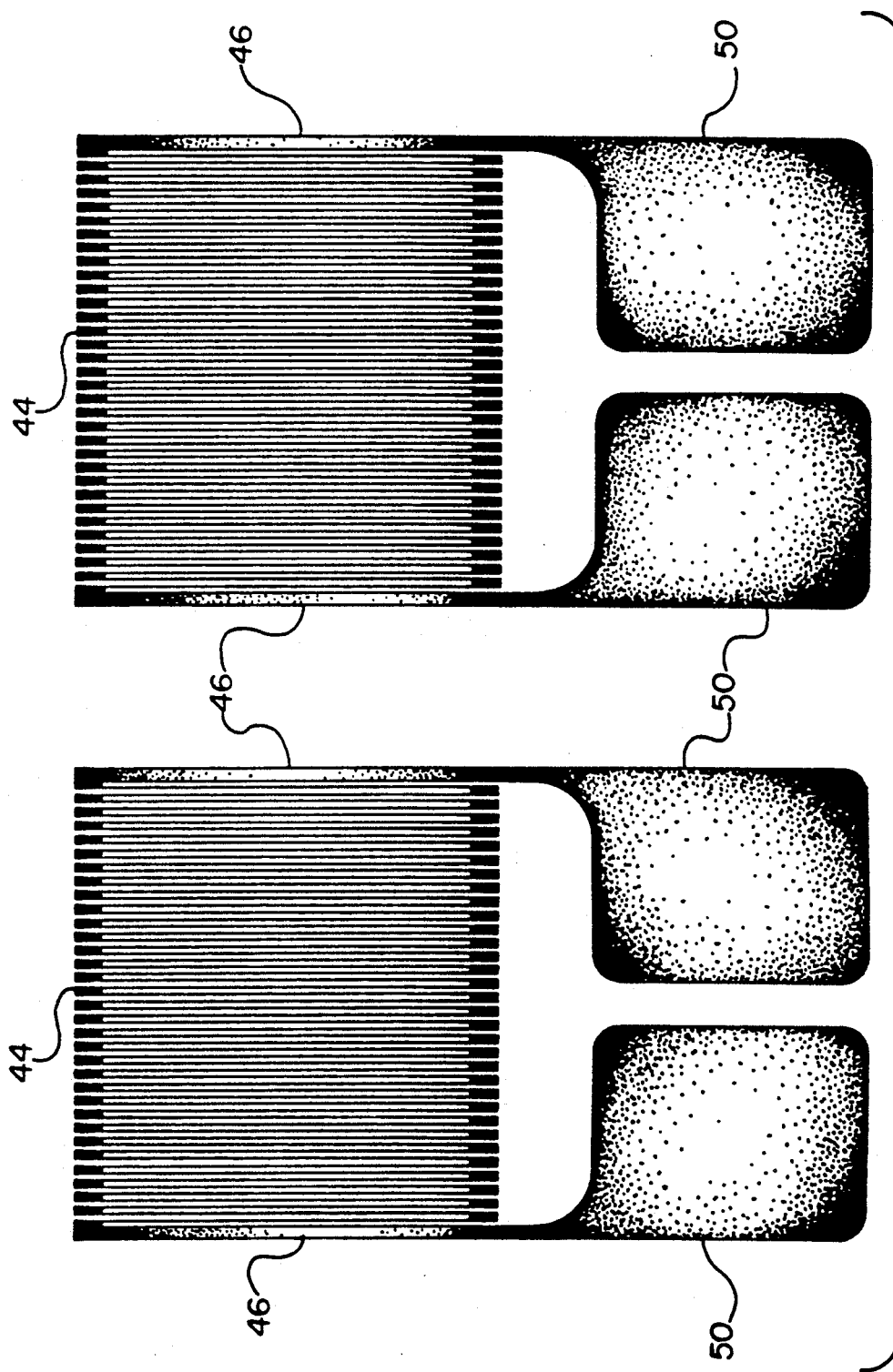
FIG. 5 is a greatly enlarged view of the strain gauge pattern employed on the sensing beam.

A pair of strain gauges 42 is formed on each side of the center of the strain sensing beam 36. Preferably the strain gauges are formed by thin film patterning techniques and comprise a 2 $\mu m$ thickness of NiCr. The thin film patterning techniques are well known in the art and will not be described further herein. A greatly enlarged diagram of the masks employed to form the strain gauges are shown in FIG. 5.

Preferably, the strain gauges measure 1.65 mm×2.80 mm with 33 convolutions in the surpentine pattern portion 44. After forming, the strain gauges are trimmed by a laser to exhibit a desired resistance to within ±0.1%.

During laser trimming, the width of the outer legs 46 are made thinner to increase total resistance.

The active portions of the strain gauges are covered with a passivation layer of SiO$_2$ 46, using standard thin film patterning techniques. Leads 48 are attached to contact pads 50 of the strain gauges using standard integrated circuit wire bonding techniques.

According to the present invention, the material of the strain sensing beam 36 and the strain gauges 42 are chosen so that their coefficients of thermal expansion are matched to within a factor of 2. In the preferred embodiment, stainless steel having a thermal coefficient of expansion $\alpha$ of $13.3 \times 10^{-6}$ cm/cm/°C. is employed to form the strange sensing beam 36. The coefficient expansion of $\alpha$ of NiCr is $14.1 \times 10^{-6}$ cm/cm/°C. and the coefficient of SiO$_2$ is $12.6 \times 10^{-6}$ cm/cm/°C.

Returning to FIG. 1, the wide ends of the strain sensing beam 36 are mounted in the slots 32 and 34 formed by the load flexure 12. Enough clearance is provided between the ends of the strain sensing beam 36 and the slots 32 and 34 such that the strain sensing beam is put under no strain when placed in the slots.

The strain sensing beam 36 is secured in the mounting slots 32 and 34 by injecting an amalgam into the region between the ends of the beam and the slots as shown by the cross hatched regions in FIG. 2. Preferably, the amalgam is Ga-Ni which is liquid when formed and solidifies when heated to 60° C. The thermal coefficient of expansion of Ga-Ni amalgam can be adjusted to between $8.64 \times 10^{-6}$ to $72 \times 10^{-6}$ cm/cm/°C. by controlling the ratio of constituents.

According to the present invention, the ratio of the constituents of the amalgam is chosen such that the coefficient of expansion of the amalgam is within a factor of 2 of the coefficient of the strain sensing beam 36, and preferably $13.3 \times 10^{-6}$ cm/cm/°C. The preferred amalgam coefficient is achievable with a ratio of Ga to Ni of 72/28.

Figure 6:
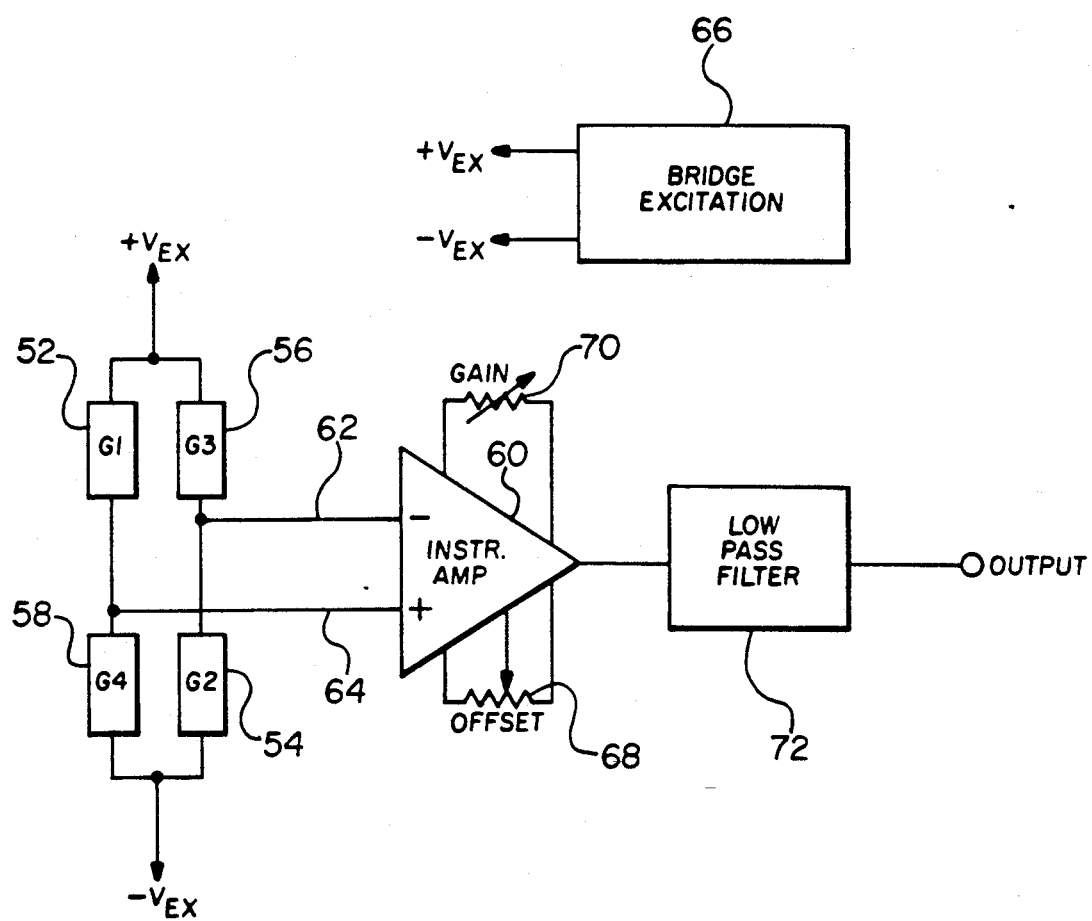
FIG. 6 is a schematic circuit diagram illustrating the bridge circuit of the load cell of FIG. 1.

FIG. 6 illustrates the incorporation of the load cell in a measuring circuit. Gauges 52-58 are connected in a full bridge configuration with gauges 52 and 54 being on the top and gauges 56 and 58 being on the bottom of the beam. The connection to the instrumentation amplifier's input terminals 62,64 provides a negative voltage output for a downward (i.e. compressive) force. The gauge resistance is chosen to be about 3000Ω to maximize the noise performance of the amplifier 60. The amplifier 60 may be, for example, an Analog Devices AD624 TM instrumentation amplifier, available from Analog Devices Corporation, Norwood, Mass. A very low noise, high stability power supply 66 provides a bipolar bridge excitation which increase sensitivity and resolution of the system. The low noise high stability power supply 66 comprises, for example, a buffered REF10 TM precision low noise reference power supply available from Burr Brown Corp., Tuscon, Ark. The buffering of the power supply is done with an inverting and a non-inventing low noise operational amplifier such as Analog Devices AD707 TM as is well known in the art. Accurate trimming of the gauges eliminates the need for bridge balance circuitry. The offset potentiometer 68 removes residual bridge imbalance and amplifier electronic offset. Gain is adjusted by potentiometer 70 to provide a convenient scale factor at the output. A lowpass filter 72, preferably a second order Butterworth low pass filter as is well know in the art, reduces the broadband noise and hence resolution. Filter rolloff is chosen to suite the application, however, it is typically between 1 Hz and 1 Khz.

The range of loads that can be sensed with the load cells measurement range of the present invention can be adjusted merely by varying the stiffness of the load flexure 12, providing more or less stiff upper and lower flexures.

Industrial Applicability and Advantages

The load cell constructed according to the present invention is useful in a variety of force transducing applications in industry, such as measuring the force exerted on a machine tool or on a deformable optical element. The load cells are advantageous in the uniformity of thin film gauges and the ability to trim their resistances after application to the strain sensing beam creates a truly balanced bridge. Temperature compensation and balancing resistors are not required. Extremely precise physical placement of the gauges on the strain sensing beam are possible due to the photofabricating manufacturing technique employed, thereby ensuring balanced strains on all gauges. By matching the thermal expansions coefficients in the material of the beam, the gauges and the mounting amalgam, a fully temperature compensated bridge is achieved.

The simple 2 layer construction of the strain gauges, combined with the very low strain mounting techniques employing the amalgam bonding essentially eliminates any hysteresis and creep associated with conventional bonded gauges. The load cells are fully vacuum compatible and can be employed in extreme environments, virtually eliminating outgasing and zero shift encountered with polymeric materials often employed in bonded gauges when used in a vacuum environment. A single strain sensing beam design can be employed to measure wide ranges of forces simply by varying the stiffness of the load flexure.

I claim:
1. A load cell, comprising:
   a. a loading flexure defining mounting slots for receiving the ends of a strain sensing beam;
   b. a strain sensing beam including an I-shaped member having a tapered width along its length, and pairs of thin film strain gauges located on each side of the center of the beam;
   c. the strain sensing beam being mounted in the slots with a solidifiable amalgam; and
   d. the thermal expansion coefficients $\alpha$ of the I-shaped member, the strain gauges, and the amalgam being matched to within a factor of 2.

2. The load cell claimed in claim 1, wherein the I-shaped member is stainless steel having a coating on both sides of SiO$_2$, and further comprising a coating over the active area of the strain gauges of a passivation layer of SiO$_2$.

3. The load cell claimed in claim 2, wherein the strain gauges are formed from a layer of NiCr, and the amalgam is Ga-Ni formulated to have a coefficient of thermal expansion $\alpha = 8.64 \times 10^{-6}$ cm/cm/°C.

4. The load cell claimed in claim 3 wherein the loading flexure is stainless steel.

5. The load cell claimed in claim 3 wherein the I-shaped stainless member is 0.060 inches thick, the SiO$_2$ coating is 1 μm thick, and the NiCr 2 μm thick.

6. A method of mounting a strain sensing beam having a strain gauge in a load cell comprising the steps of:
 a. providing notches in the load cell to loosely receive the ends of the strain sensing beam;
 b. placing the strain sensing beam in the notches;
 c. preparing a liquid amalgam having a thermal coefficient matched to the thermal coefficient of the strain gauge to within a factor of 2;
 d. filling the gaps between the strain gauge and the notches with the amalgam; and
 e. causing the amalgam to solidify.

7. The method claimed in claim 6, wherein the strain sensing beam comprises stainless steel. the strain gauge comprises NiCr and the amalgam comprises Ga-Ni.

* * * * *